United States Patent
Nagao

(10) Patent No.: US 7,370,784 B2
(45) Date of Patent: May 13, 2008

(54) FRICTION STIR WELDING APPARATUS AND ROBOT EMPLOYING THE APPARATUS

(75) Inventor: Yasuhide Nagao, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 148 days.

(21) Appl. No.: 10/250,637

(22) PCT Filed: Oct. 17, 2002

(86) PCT No.: PCT/JP02/10770

§ 371 (c)(1),
(2), (4) Date: May 10, 2004

(87) PCT Pub. No.: WO03/033198

PCT Pub. Date: Apr. 24, 2003

(65) Prior Publication Data

US 2004/0195290 A1    Oct. 7, 2004

(30) Foreign Application Priority Data

Oct. 17, 2001   (JP)   ............... 2001-319479

(51) Int. Cl.
*B23K 20/12* (2006.01)
(52) U.S. Cl. ..................... 228/2.1; 228/112.1
(58) Field of Classification Search ............. 228/112.1, 228/2.1, 114.5, 2.3, 234.1; 156/73.5, 580
See application file for complete search history.

(56) References Cited

U.S. PATENT DOCUMENTS 4,122,990 A * 10/1978 Tasaki et al. ................. 228/2.3

(Continued)

FOREIGN PATENT DOCUMENTS

DE   19957136 C1 * 2/2001

(Continued)

OTHER PUBLICATIONS

Japanese Patent Office Communication for Japanese patent application JP2001-319479, dated Dec. 10, 2003, English translation of the "Notice of Reasons For Rejection", 2 pages and Japanese text, 2 pages.

(Continued)

*Primary Examiner*—Jonathan Johnson
*Assistant Examiner*—Michael Aboagye
(74) *Attorney, Agent, or Firm*—Marshall, Gerstein & Borun LLP

(57) ABSTRACT

A friction stir welding apparatus capable of stably applying a pressure force without enlarging the apparatus, and a robot having thereof are provided. A rotating tool (22) is provided with a rotational shaft (26) and a hollow surrounding shaft (27) is provided to surround the rotational shaft (26). The rotational shaft (26) is movable along an axis-of-rotation (L) and is rotated by a rotation drive motor (25) about the axis-of-rotation (L). The surrounding shaft (27) is rotatably supported by a main frame (29) and an outer threaded portion is formed around the outer peripheral thereof to be threadedly engaged with a nut member 53. The rotating tool (22) is rotatably supported by a header (40), and the header (40) and the nut member 53 are coupled together through a bracket (70). Therefore, when the surrounding shaft (27) is rotated about the axis-of-rotation (L) by the linear movement motor (24), the rotating tool (22) is linearly moved through the nut member 53, the bracket (70) and the header (40), and can apply a pressure force against work pieces.

21 Claims, 7 Drawing Sheets

U.S. PATENT DOCUMENTS

| | | | |
|---|---|---|---|
| 4,623,277 A * | 11/1986 | Wayne et al. | 403/314 |
| 5,100,271 A | 3/1992 | Kameyama et al. | |
| 5,893,507 A * | 4/1999 | Ding et al. | 228/2.1 |
| 6,264,088 B1 * | 7/2001 | Larsson | 228/2.1 |
| 6,299,050 B1 * | 10/2001 | Okamura et al. | 228/110.1 |
| 6,302,315 B1 * | 10/2001 | Thompson | 228/112.1 |
| 6,421,578 B1 * | 7/2002 | Adams et al. | 700/212 |
| 6,499,649 B2 * | 12/2002 | Sayama et al. | 228/112.1 |
| 6,799,708 B2 * | 10/2004 | von Strombeck et al. | 228/2.1 |
| 6,832,713 B2 * | 12/2004 | Kano et al. | 228/2.1 |

FOREIGN PATENT DOCUMENTS

| | | |
|---|---|---|
| EP | 1 281 468 A2 | 2/2003 |
| JP | 11-226758 A1 | 8/1999 |
| JP | 2000-219402 | 3/2002 |
| JP | 2002-137067 A1 | 5/2002 |
| JP | 2002-178168 A1 | 6/2002 |
| JP | 2002-273578 | 9/2002 |
| WO | WO 95-26254 | 10/1995 |
| WO | WO 0128732 A1 * | 4/2001 |

OTHER PUBLICATIONS

International Search Report from Japanese Patent Office dated Jan. 15, 2003 for International Patent Application No. PCT/JP02/10770.
Development of Spot FSW Robot System For Automobile Body Members by Ritsuo Sakano, et al.; for Mazda Motor Corportion and Kawasaki Heavy Industries, Ltd. (11 pages), no date.

* cited by examiner

FRICTION STIR WELDING APPARATUS AND ROBOT EMPLOYING THE APPARATUS

FIELD OF THE PRESENT INVENTION

The present invention relates to a friction stir welding apparatus for welding two or more over-wrapped work pieces together by pressing a rotating tool against an outermost work piece to soften the work pieces by frictional heat and then to stir the molten material of the work pieces, and relates to a robot equipped with the apparatus.

BACKGROUND OF THE PRESENT INVENTION

Although some of the methods of joining aluminum bodies of automobiles is spot welding, riveting, etc., there is several problems such that it requires complicate piping structures on a robot (for example, supply and ground of electricity, supply and drain of water, and supply and drain of oil), and causes an undesirable working environment with large noises and electrical sparks, etc.

To solve such a problem, there is proposed a spot welding apparatus for example, in German Patent Application Laid-Open DE 197 31 638, International Publications WO 98/04381, WO 01/28732, and WO 01/036144, which carries out a friction stir welding of two over-wrapped work pieces by pressing a high-speed rotating tool against one outer surface of the work pieces.

FIG. 7 is a view showing a configuration of a spot welding gun 1, which is a conventional friction stir welding apparatus, utilizing the technologies of the above disclosures. This spot welding gun 1 comprises a rotating tool 3 having a pin 2 at a tip end thereof, and presses the rotating tool 3 against one of work pieces (not shown) while rotating the rotating tool 3 at high speed, and then softens and stirs a joining part of the work pieces with the pin 2 with the frictional heat by rotation, and thus joins the work pieces together.

The spot welding gun 1 also comprises a rotational movement drive source 4 for rotating the rotating tool 3 generally oriented downward about an axis-of-rotation L thereof at a high-speed, and a linear movement drive source 5 for linearly moving the rotating tool 3 along the axis-of-rotation L. The rotating tool 3 is fixed to the lower end of a rotational shaft 7 being rotated about the axis-of-rotation L by the rotational movement drive source 4. This rotating tool 3 is limited its linear movement along the axis-of-rotation L, and is held by a header 10 so as to be rotatable about the axis-of-rotation L. Moreover, a pressurizing shaft 6 is provided so as to surround the rotational shaft 7 and the header 10 is fixed to the lower end of this pressurizing shaft 6.

An outer peripheral of the pressurizing shaft 6 is formed to be an outer threaded portion onto which a nut member 11 is threadedly engaged. These are implemented by for example, a ball-screw mechanism. As the nut member 11 is rotated by the linear movement drive source 5, the pressurizing shaft 6 moves upward or downward along the axis-of-rotation L. Since the rotating tool 3 is rotatably supported through the header 10 at the lower end of the pressurizing shaft 6, the rotation of the rotational shaft 7 by the rotational movement drive source 4 causes a high-speed rotation of the rotating tool 3 as well as the linear movement.

The above mechanism is attached to the main frame 14. To the main frame 14, a gun arm 12 is fixed extending downward from to the main frame 14. The lower portion of the gun arm 12 is bent and a receiving portion 13 which opposes the rotating tool 3 is provided at a tip end of the lower portion. With this configuration, by moving the rotating tool 3 downward while rotating it at a time of welding, work pieces are pinched between the receiving portion 13 and the rotating tool 3 to be applied a pressure force and therefore spot welding is carried out.

However, the pressurizing shaft 6 which surrounds the rotational shaft 7 is supported by the main frame 14 through the nut member 11. When the header 10 is pulled up to the uppermost position, since an immediate upper part of the header 10 is supported by the main frame 14, the shaft is stably supported. However, when the pressurizing shaft 6 is lowered, it will be difficult to stably support the rotating tool 3 with high-speed rotation since a distance between the supporting position of the pressurizing shaft 6 and the headers 10 becomes large. Meanwhile, at the time of welding, the work pieces will be pressurized while the distance of the supporting position and the rotating tool 3 becomes large. However, since a pressure force is only transmitted through the hollow pressurizing shaft 6, it is difficult to stably transmit the pressure force with the thin pressurizing shaft.

Therefore, in order to ensure stably lowering of the rotating shaft at high rotational speed and positively applying a pressure, it is only necessary to choose a larger diameter for the pressurizing shaft 6. However, using of the larger diameter for the pressurizing shaft 6 will result in a larger ball screw mechanism, pulley, etc., and thus a new problem will arise that the size of the whole apparatus becomes larger.

SUMMARY OF THE PRESENT INVENTION

The purpose of the present invention is to provide a friction stir welding apparatus capable of stably applying a pressure force without enlarging the size of the whole apparatus, and to provide a robot equipped thereof.

In the present invention, the friction stir welding apparatus is provided in which a rotating tool with high-speed rotation is moved along the axis-of-rotation of the rotating tool, a tip portion of the rotating tool is pressed against two or more over-wrapped work pieces, a contact portion of the work pieces with the tip portion of the rotating tool is forced to be soften and stirred by frictional heat generated by the rotating tool, and thus the work pieces are welded together. The friction stir welding apparatus comprises a rotational shaft extending along the axis-of-rotation, a rotational movement drive source for rotating the rotational shaft, a hollow surrounding shaft surrounding the rotational shaft, rotating tool holding means for rotatably holding at least one of the rotating tool or the rotating shaft and being movably supported in the axis-of-rotation, and a linear movement drive source for linearly moving the rotating tool along the axis-of-rotation by linearly moving the rotating tool holding means along the axis-of-rotation. The rotating tool integrally includes a pin which forms said tip portion and a shoulder portion which has a larger diameter than the pin and which is connected with the pin at one end so that the pin protrudes therefrom.

According to the present invention, the rotational shaft is supported for example, telescopically by a hollow shaft ("a surrounding shaft" in the present invention) surrounding the rotational shaft which generally corresponds to the conventional pressurizing shaft. Here, the surrounding shaft supports the rotational shaft so as to permit both a linear movement along the axis-of-rotation and a rotational movement about the axis-of-rotation. Furthermore, the rotational shaft having the rotating tool at a tip end thereof is held by the rotating tool holding means integrally rotatable with the rotating tool in the position of the rotating tool and/or the rotational shaft. The rotating tool holding means is linearly movable along the axis-of-rotation, and thus the holding position of for example the frame main to which the rotating tool holding means is linearly movable along the axis-of-rotation with the rotating tool (and the rotational shaft). Therefore, the relative position between the above-mentioned holding position and the rotating tool remains unchanged Therefore, according to the present invention, since it is not necessary to choose a surrounding shaft (i.e., corresponding to the conventional pressurizing shaft) with a larger diameter surrounding the rotational shaft, it is not necessary to enlarge the size of the whole apparatus. Moreover, according to the present invention, since it does not apply a pressure force only by the hollow surrounding shaft but also apply a pressure force with the whole rotating tool holding means to hold the rotating tool and its rotational shaft, it can increase the pressure force and further it can stably apply the pressure force.

In addition, the friction stir welding apparatus according to the present invention may be independently or integrally provided with the rotating tool.

The above-mentioned rotating tool holding means may be constituted so that it may detachably hold the rotating tool, and this may be implemented by a header having for example a collect chuck.

Since the above-mentioned rotating tool holding means applies a pressure force by the whole, it is preferably formed from a rigid material.

Although one structure for supporting the above-mentioned rotating tool holding means linearly movable along the axis-of-rotation is a linear guide, for example. However, other structures may also be utilized as a matter of course.

Moreover, as a structure of driving the rotating tool holding means along the axis-of-rotation, it may be constituted so that for example the linear movement drive source rotates the surrounding shaft, and the rotating tool holding means is provided with a hole into which the surrounding shaft is inserted. Threaded portions are formed in the inner peripheral surface of the hole and the outer peripheral surface of the surrounding shaft, respectively, which threadedly engage each other. According to this simple structure, a rotational movement of the surrounding shaft by the linear movement drive source is securely converted into a linear movement of the rotating tool holding means.

In the above-mentioned structure, it is also possible to intervene a cylindrical nut member having a threaded portion formed in an inner peripheral surface thereof at the threadedly-engaged portion with the surrounding shaft of the rotating tool holding means. Thereby, since it becomes unnecessary to directly form a threaded portion in the rotating tool holding means, processing of the rotating tool holding means becomes easier.

If the rotating tool holding means is made to be such a shape that its lateral cross section with respect to the axis surrounds the axis-of-rotation (for example, a C-shape or a channel-shape), It can cover movable parts of the above-mentioned apparatus, and then can attain high rigidity and provide a reliable pressure force.

Moreover, the rotating tool utilized in the friction stir welding apparatus according to the present invention is preferably formed such that a surface of the shoulder portion on the protruding side of the pin is more recessed as being closer to the base end portion of the pin. In accordance with such configuration, when applying a pressure force, since the outer edge portion of the shoulder portion is mainly pressed against the work piece surface, it is possible to generate a frictional heat throughout a larger area while the softened part of the work pieces stays around the pin, and not to leave a pin-mark after pulling out the pin.

DESCRIPTION OF THE PREFERRED EMBODIMENTS

Hereafter, one embodiment according to the present invention is explained based on the attached drawings.

Figure 1:
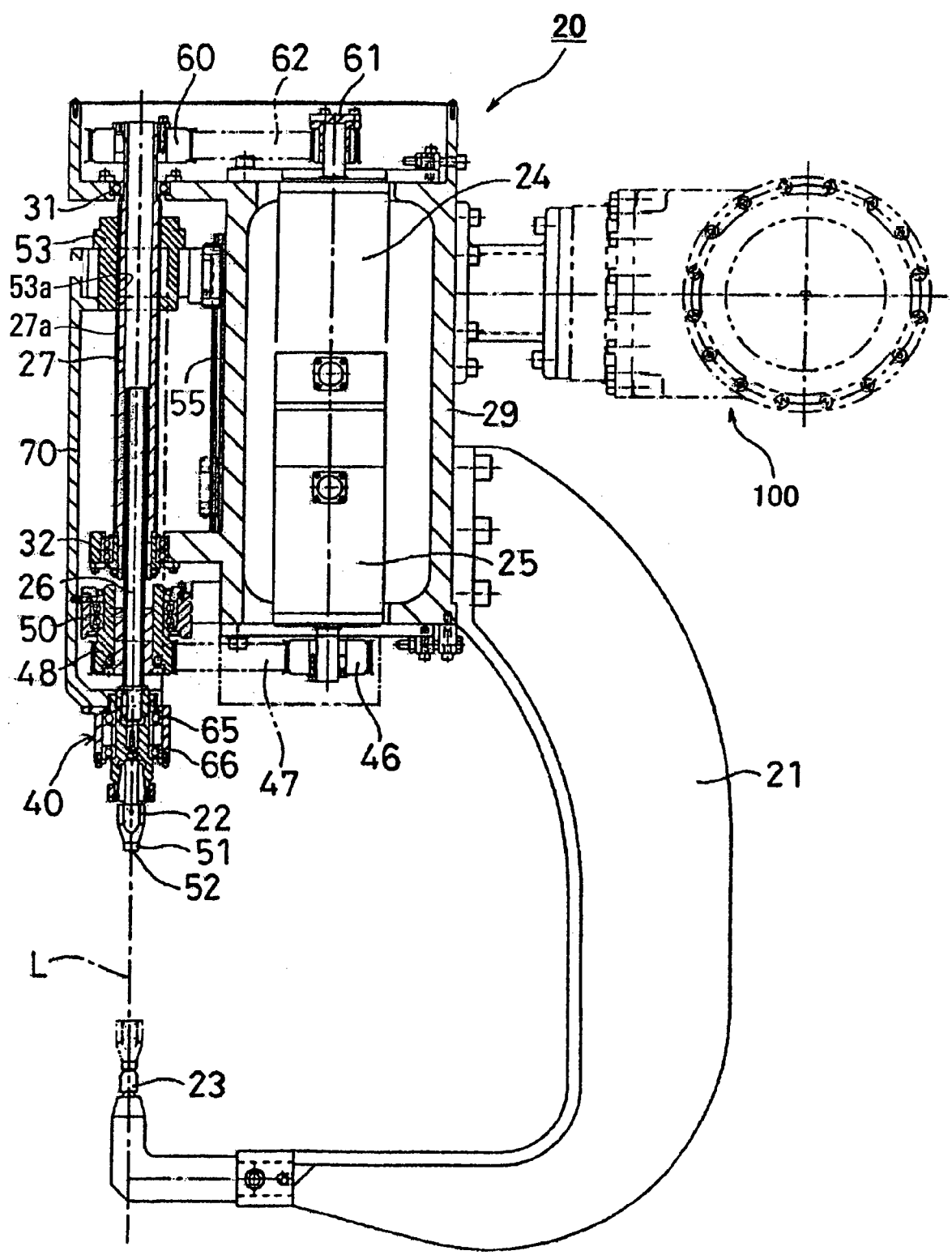
FIG. 1 is a sectional side elevation view showing a configuration of a spot welding gun according to one embodiment of a friction stir welding apparatus of the present invention.
Figure 2:
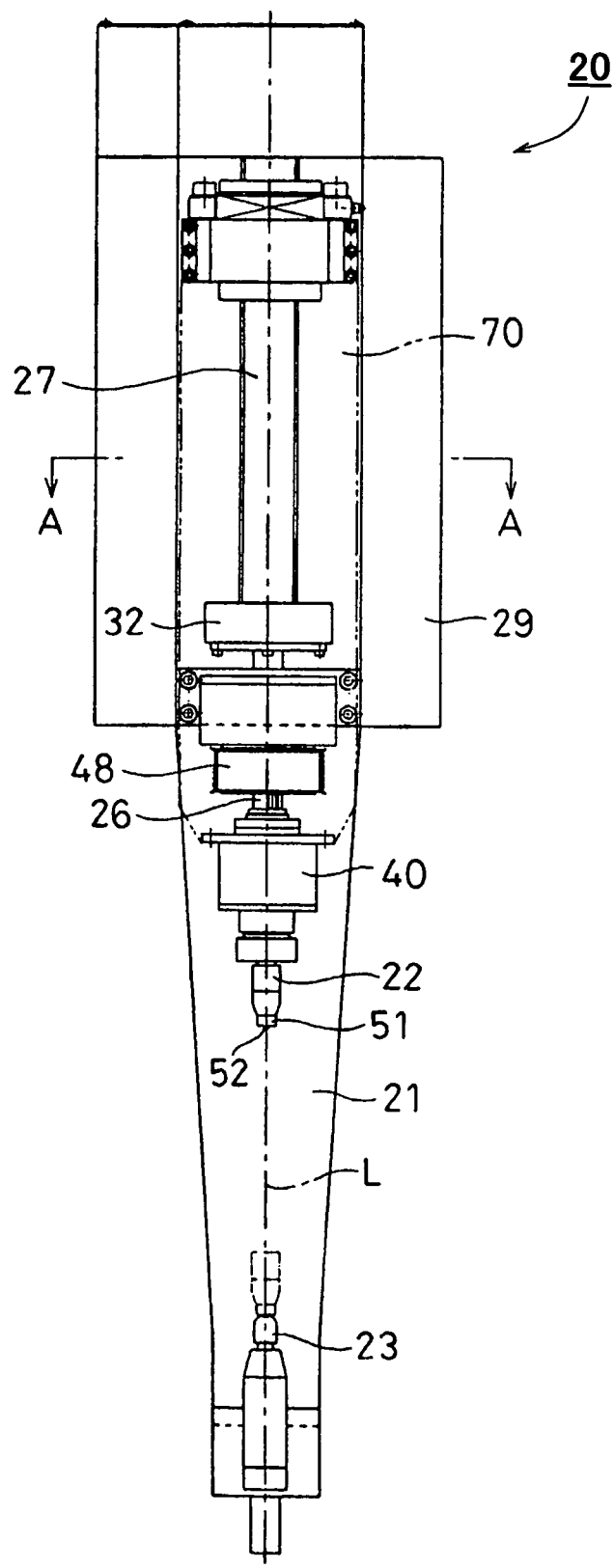
FIG. 2 is an front view of the spot welding gun of FIG. 1.

FIG. 1 is a sectional side elevation view showing a configuration of a spot welding gun 20 which is one form of embodiments of a friction stir welding apparatus of the present invention. FIG. 2 is a front view of the spot welding gun 20 of FIG. 1. The spot welding gun 20 is mounted to for example a six-degrees-of-freedom-multiple-joint type robot's wrist part, and is utilized for carrying out a spot welding of the work pieces (such as aluminum bodies of an automobile, etc.) made of aluminum alloy by a friction stir welding. The spot welding gun 20 is mounted to for example a six-freedom-multiple-joint type robot's wrist part, and is utilized for carrying out a spot welding of the work pieces (such as aluminum bodies of an automobile, etc.) made of aluminum alloy by a friction stir welding.

As shown in FIGS. 1 and 2, the spot welding gun 20 is attached to the wrist part of the robot 100 with a rotating tool 22. The spot welding gun 20 comprises a main frame 29 for supporting the rotating tool 22 so as to apply a pressure force to the rotating tool 22, a gun arm 21 attached to the main frame 29, a linear-movement motor (i.e., a linear movement drive source) 24 for linearly moving the rotating tool 22, and a rotational movement motor (i.e., a rotational movement drive source) 25 for rotating the rotating tool 22.

The rotating tool 22 has a truncated-cone shape and is supported by the main frame 29 rotatable about the axis-of-rotation L which is the center line of the truncated-cone shape, while the tip side is oriented downward. A circular-pillar-shaped shoulder portion 51 is formed in the tip end portion of the rotating tool 22, and a circular-pillar-shaped pin 52 which has its axial center line coaxial with the axis-of-rotation L protrudes downwardly from the lower end surface of the shoulder portion 51. Moreover, the rotating tool 22 is adapted to be movable upwardly and downwardly along the axis-of-rotation L.

The linear movement motor 24 and the rotational movement motor 25 each of which is implemented by a servo motor are fixed to the upper part of the main frame 29. The gun arm 21 fixed to the main frame 29 is bent approximately in the shape of the letter "L", a receiving portion 23 is fixed to the tip end portion of the gun arm 21, the receiving portion 23 has generally a circular-pillar shape, and is arranged such that its upper end surface opposes to the tip end of the rotating tool 22 coaxial with the axis-of-rotation L.

Figure 3:
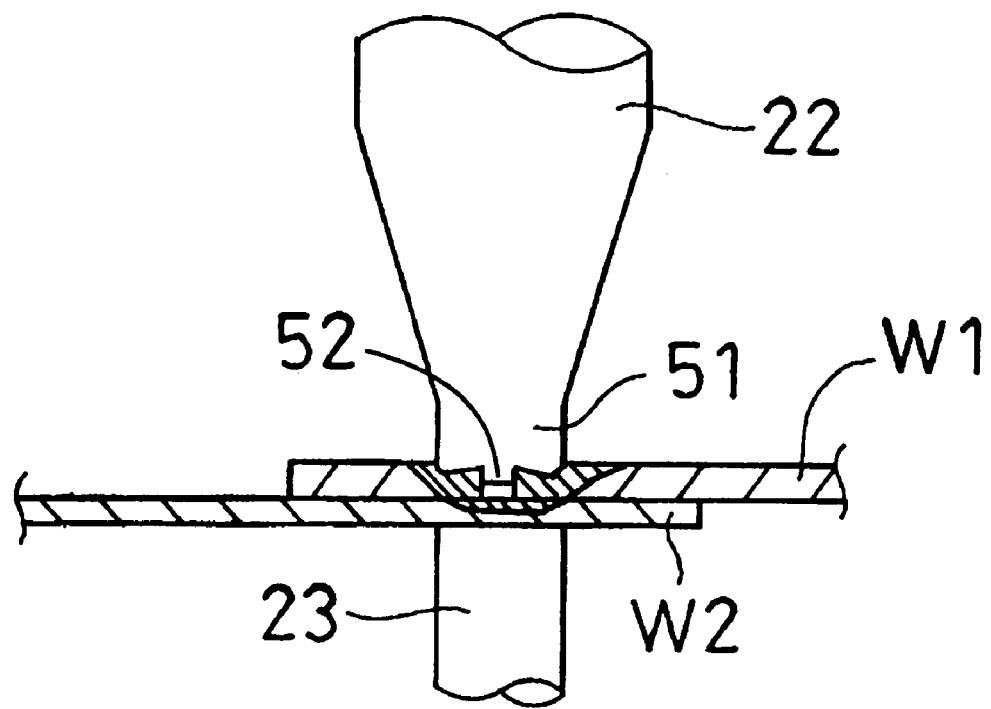
FIG. 3 is a view for explaining a spot welding method by means of the spot welding gun of FIG. 1.

Next, with reference to FIG. 3, the friction stir welding method is further explained.

For example, when carrying out a spot welding of two sheets of board-like work pieces W1 and W2 made of aluminum alloy, each of which are approximately 2 mm in thickness, the spot welding gun 20 is aligned by the robot 100 so that the receiving portion 23 is positioned right under a welding point of the work pieces W1 and W2 being over-wrapped. Next, while the rotating tool 22 is rotated by the rotational movement motor 25 at a high speed (for example, 2500 rpm-3000 rpm) and is moved downwardly by the linear movement motor 24, the gun 20 is moved upwardly by the robot 100 and thus the pin 52 at the tip end of the rotating tool 22 and the receiving portion 23 simultaneously contact the work pieces W1 and W2. When the pin 52 contacts the welding point of one of the work pieces (for example, W1), while the work piece W1 is soften by the frictional heat due to the rotation of the pin 52 and the mother material of the work pieces is stirred and induced a plastic flow following the pin 52 is inserted therein. When further pressure force is applied, while the shoulder portion 51 is pressed against the surface of the work piece W1 and the further plastic flow of the work piece W1 is induced by the rotation of the shoulder portion 51, a plastic flow of the work piece W2 is also induced. Soon, the pin 52 is also penetrated in the work piece W2, and the further plastic flow is induced in the work piece W2. Thus, at the welding point, two sheets of the work pieces W1 and W2 over-wrapped are both induced the plastic flow and are welded together.

Moreover, the tip end of the rotating tool 22 is provided with the shoulder portion 51 of which lower end surface is dented toward its center and the pin 52 protrudes from its center. That is, the lower end surface of the shoulder portion 51 has a shape such that its edge portion is extended downward. Therefore, the edge portion is mainly pressed against the work piece surface when applying a pressure, and it can stir effectively.

In this way, after applying a predetermined pressure force (for example, several 100 kg/cm2) for a predetermined time (for example, several seconds), the linear movement motor 24 is reversed to move the rotating tool 22 upwardly. When the rotating tool 22 is moved upward and the pin 52 is drawn out, the welding point is cooled by ambient air and is harden. Thus, at the welding point, the work pieces are welded with a narrow trace of the tip protrusion of the pin remained. Then the robot 100 moves the spot welding gun 20 to the next welding point, and performs another spot welding successively.

Next, again with reference to FIGS. 1 and 2, the configuration of the spot welding gun 20 is explained further in detail.

The rotational shaft 26 is coupled with the rotating tool 22. The rotational shaft 26 is a spline shaft extended upwardly from the rotating tool 22 along the axis-of-rotation L, and a pulley 48 is fitted on a lower position of the rotational shaft 26. The pulley 48 transmits a torque to the rotational shaft 26 while it permits a movement of the rotational shaft 26 along axis-of-rotation L but prevents a rotation of the rotational shaft 26 about the axis-of-rotation L, by the spline formed on the inside surface thereof. This pulley 48 is supported by the main frame 29 rotatably about the axis-of-rotation L through bearings 50.

A pulley 46 is also fixed on the output shaft of the rotational movement motor 25 which is fixed downwardly to the main frame 29 and a belt 47 is wrapped around the pulleys 46 and 48. Thus, by rotating the rotational movement motor 25, the rotating tool 22 is rotated.

A hollow surrounding shaft 27 is provided in the upper part of the rotational shaft 26 so as to surround the rotational shaft 26. The hollow surrounding shaft 27 is supported by bearings 31 and 32 (only one bearing 32 is shown in FIG. 2) at both upper and lower ends, respectively, rotatably about the axis-of-rotation L. The rotational shaft 26 inserted in the hollow surrounding shaft 27 is protruded from the lower end of the hollow surrounding shaft 27 downwardly.

Figure 4:
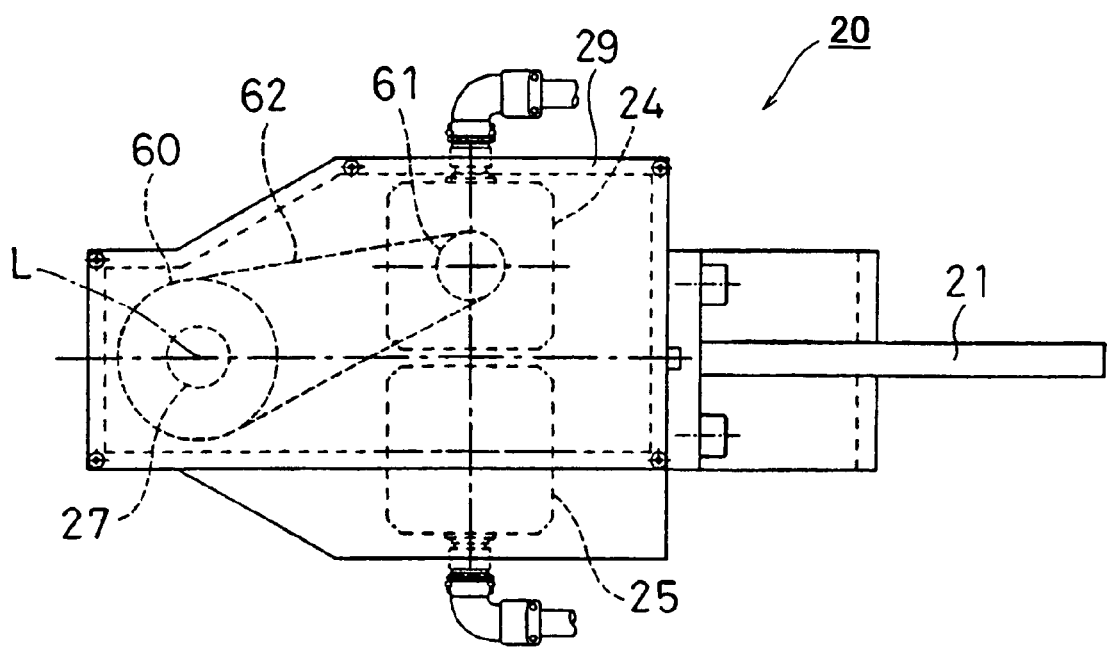
FIG. 4 is a plan view of the spot welding gun of FIG. 1.

As also shown in the plan view of the spot welding gun 20 in FIG. 4, a pulley 60 is fixed to the upper end part of the hollow surrounding shaft 27. A pulley 61 is also fixed to the output shaft of the linear movement motor 24 fixed to the gun arm 21 upwardly on the rotational movement motor 25 and a belt 62 is wrapped around the pulley 61 and the pulley 60 which is fixed to the hollow surrounding shaft 27. Thus, by activating the linear movement motor 24, the hollow surrounding shaft 27 can be rotated about the axis-of-rotation L.

An outer threaded portion 27a is formed around the outer periphery of the hollow surrounding shaft 27 and an inner threaded portion 53a of a nut member 53 is threadedly engaged with the hollow surrounding shaft 27. The nut member 53 is located between the bearings 31 and 32 which support the hollow surrounding shaft 27 at both upper and lower ends. The hollow surrounding shaft 27 and the nut member 53 is implemented by for example, a ball-screw mechanism. A linear guide 55 is fixed to the gun arm 21 so that it opposes the hollow surrounding shaft 27 and is oriented in parallel with the axis-of-rotation L, and the nut member 53 is supported by the linear guide 55 so as to be linearly guided along the axis-of-rotation L.

The rotating tool 22 is rotatably attached to a header 40. The header 40 holds the rotating tool 22 rotatably about the axis-of-rotation L through bearings 65 and 66. The header 40 and the nut member 53 are connected through a bracket 70

Figure 5:
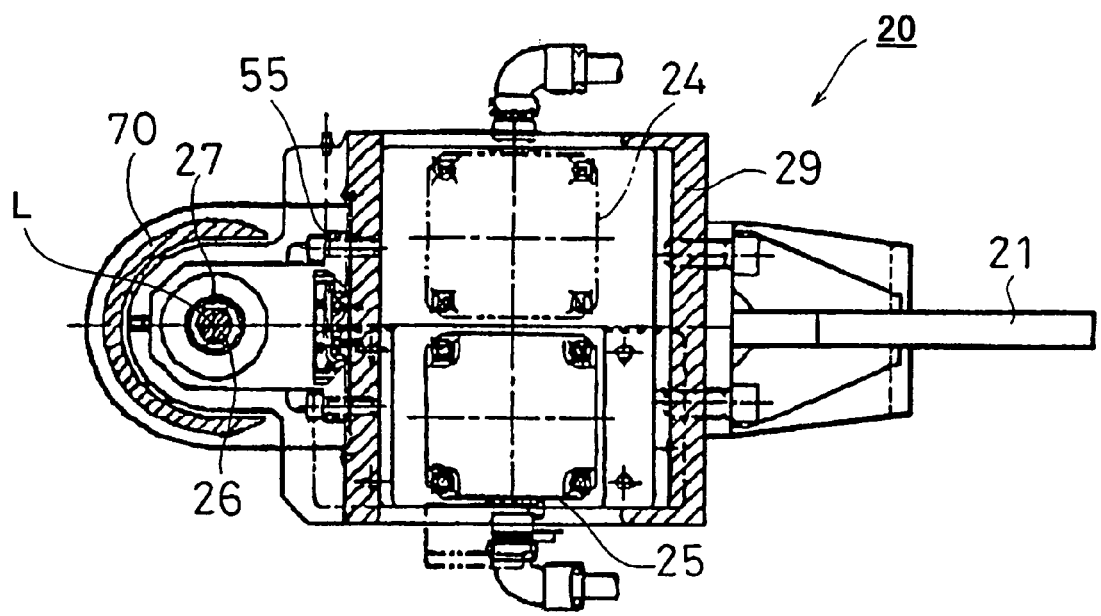
FIG. 5 is a sectional view of the spot welding gun along with the line A-A in the FIG. 2 showing a structure of a bracket.

FIG. 5 is a horizontal sectional view taken along the line A-A in FIG. 2. As seen from the figure, the bracket 70 is extended along the axis-of-rotation L, and is generally a C-shaped in cross-section such that it surrounds the axis-of-rotation L. Along the axis of rotation L, the nut member 53, the surrounding shaft 27, and the header 40 are arranged in this order from top. Since the bracket 70 is made of high rigidity material, such as iron, carbon steel, or stainless steel and is generally a C-shaped in cross-section having the axis-of-rotation L as its center, the applied pressure force by the nut member 53 can be securely transmitted to the header 40. Thus, the pressure force of the linear movement motor 24 is directly transmitted to the header 40 which holds the rotating tool 22 through the bracket 70.

As mentioned above, in the prior art, the pressure force applied to the rotating tool was transmitted from the pressurizing shaft coupled with the header. That is, the pressure force is transmitted only from the hollow shaft, and the pressurizing shaft itself is supported only by the main frame through the bearings. Therefore, when the rotating tool is at the uppermost position and the distance between the bearings which support the pressurizing shaft and the rotating tool is small, the rotating tool can be stably supported. However, when the rotating tool is lowered and the distance between the rotating tool and the bearings which support the pressurizing shaft becomes large, it will be difficult to stably support the rotating tool. Furthermore, in order to apply a pressure force by the hollow pressurizing shaft in this state, the diameter of the pressurizing shaft have to be sufficiently enlarged and thus the whole apparatus needed to be enlarged.

On the other hand, in the present invention, the hollow surrounding shaft 27 itself does not move and does not have a structure of transmitting a pressure force by the hollow surrounding shaft 27. Here, the nut member 53 moves in accordance with the rotation of the hollow surrounding shaft 27 and this movement of the nut member 53 is transmitted to the header 40 through the bracket 70. That is, since the pressure force is transmitted by the rigid and generally C-shaped bracket 70, it can transmit a larger pressure force, the diameter of the hollow surrounding shaft 27 does not need to be enlarged, and the whole apparatus can be constituted compactly.

Figure 6:
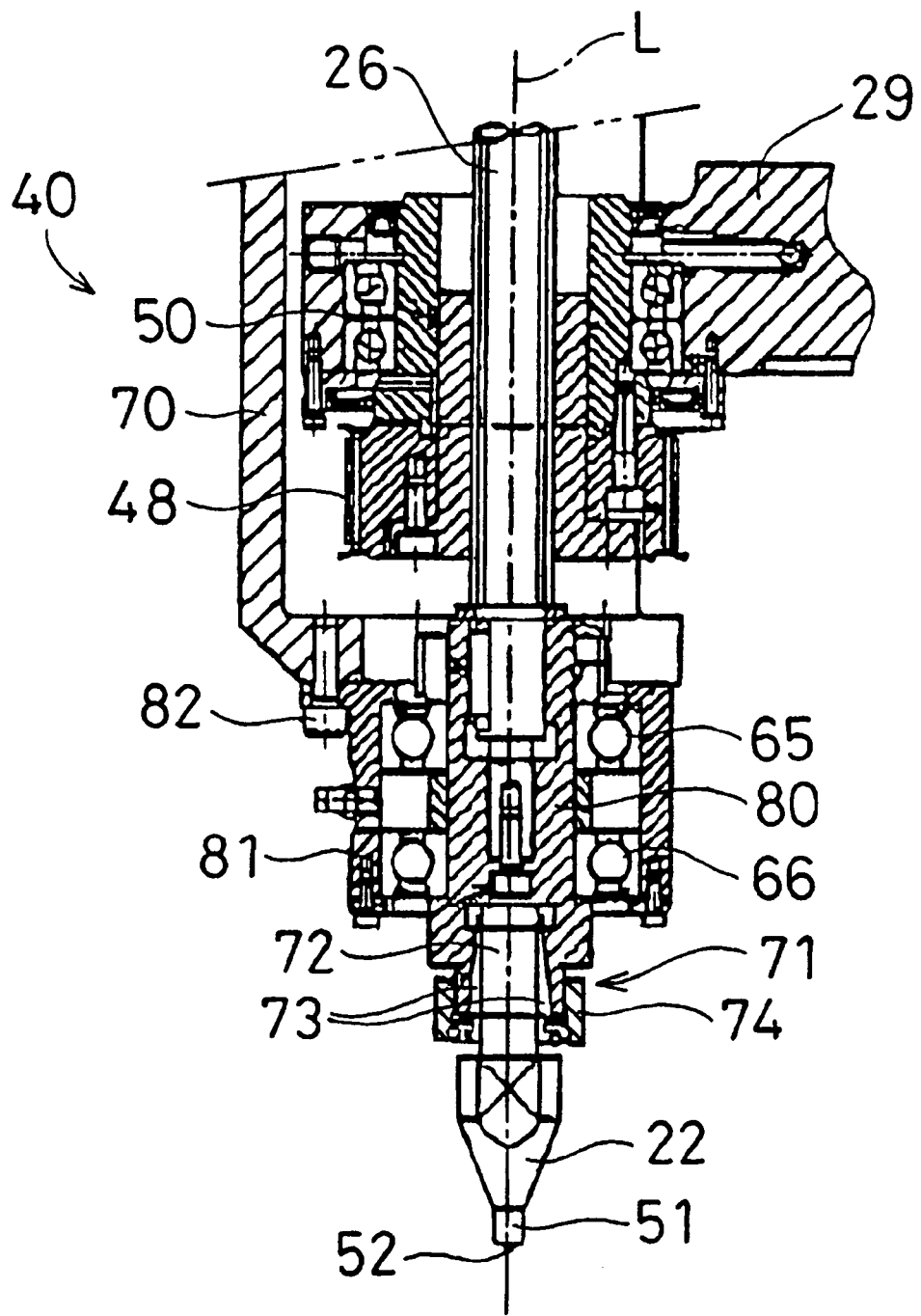
FIG. 6 is an enlarged view showing in the proximity of a header of the spot welding gun of FIG. 1.
Figure 7:
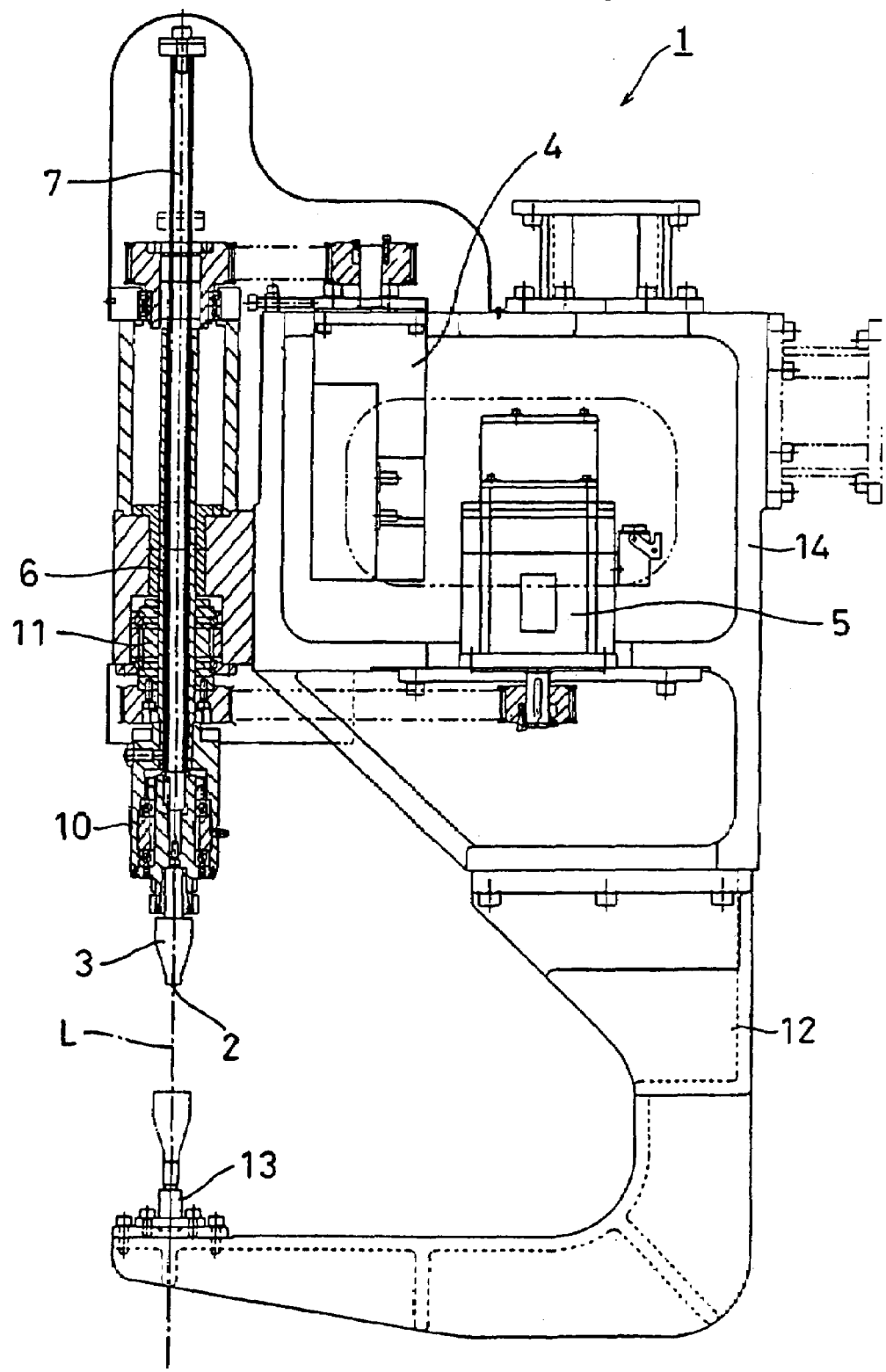
FIG. 7 is a sectional view showing a configuration of a spot welding gun as a conventional friction stir welding apparatus.

Next, with reference to FIG. 6, the coupling structure of the header 40 and the rotating tool 22 will be explained.

The header 40 is provided with a holding portion 80 for detachably holding the rotating tool 22 and an outer frame 81 for rotatably supporting the holding portion 80. A collect chuck 71 is provided in the lower end portion of the holding portion 80 and the upper part of the rotating tool 22 is integrally formed with the circular-pillar-shaped coupling shaft 72. The collect chuck 71 into which the coupling shaft 72 is inserted includes a fastening member 73 which is branched in a plurality of parts and a nut attached over the fastening member 73. In order to fix the rotating tool 22 to the holding portion 80, the coupling shaft 72 of the rotating tool 22 is inserted in the fastening member 73, and then the nut 74 is fastened. Thus, fastening member 73 fasten the coupling shaft 72 and the rotating tool 22 is fixed to the holding portion 80. When removing the rotating tool 22, on the other hand, the nut 74 is just loosened and removed. Thus, the rotating tool 22 can be easily maintained and replaced since the rotating tool 22 is constituted to be easily detachable as described above.

The holding portion 80 is supported by an outer frame 81 through a pair of bearings 65 and 66 rotatably about the axis-of-rotation L. The outer frame 81 of the header 40 and the bracket 70 are fastened together by bolts 82.

With this embodiment above, although it has been explained that the work pieces were made from an aluminum alloy, the present invention is not limited to the material and other metals or synthetic resins may be applied.

INDUSTRIAL APPLICABILITY

According to the present invention mentioned above, since it is not necessary to enlarge the surrounding shaft surrounding the rotational shaft (i.e., corresponding to the pressurizing shaft of prior art), it is not necessary to enlarge the size of the whole apparatus. Moreover, according to the present invention, since it does not apply a pressure force only by a hollow surrounding shaft but apply the pressure force with a whole rotating tool holding means for holding the rotating tool and its rotating shaft, the pressure force can be increased with more stability.

The invention claimed is:

1. A method of welding a plurality of work pieces together comprising:
    moving a rotating tool, rotating along an axis-of-rotation;
    pressing the rotating tool against the plurality of work pieces at a speed sufficient to soften the work pieces due to frictional heat and weld the work pieces together, wherein the rotating tool comprises:
    a rotational shaft, to which the rotating tool is fixed at a tip end, and extended along the axis-of-rotation;
    a rotational movement drive source for rotating the rotational shaft;
    a hollow surrounding shaft surrounding the rotational shaft, the hollow surrounding shaft fixed against linear translation;
    a rotating tool holding means for rotatably holding at least one of the rotating tool or the rotational shaft and being supported movably along the axis-of-rotation; and
    a linear movement drive source for linearly moving the rotating tool holding means along the axis-of-rotation to cause the rotating tool linearly move along the axis-of-rotation,
    wherein the rotating tool includes a pin which forms said tip portion thereof and a shoulder portion coupled with the pin so as to protrude the pin toward from one end surface thereof and having a larger diameter than the pin, and
    wherein the apparatus is so configured that the linear movement drive source rotates the hollow surrounding shaft, the rotating tool holding means having a hole into which the surrounding shaft is inserted, and the hole is formed with an inner threaded portion which threadedly engages with an outer threaded portion similarly formed on the outer peripheral surface of the hollow surrounding shaft, thereby transmitting a rotation of the hollow surrounding shaft caused by the linear movement drive source into a linear movement of the rotating tool holding means along the axis-of-rotation and
    wherein the rotating tool holding means includes a bracket made of a rigid material, and
    wherein the bracket extends along the axis of rotation and threaddedly engages the outer threaded portion of the hollow surrounding shaft at one end portion and the other portion of the bracket rotatably holds the at least one of the rotating tool or the rotating shaft.

2. A method according to claim 1, wherein the rotating tool holding means is provided with a header for detachably holding the rotating tool.

3. A method according to claim 1, wherein the bracket is made of a rigid material.

4. A method according to claim 1, wherein the rotating tool holding means is supported by a linear guide linearly movable along the axis-of-rotation.

5. A method according to claim 1, wherein the rotating tool holding means threadedly engages with the outer threaded portion of the hollow surrounding shaft through a cylindrical nut member with the inner threaded portion formed in an inner peripheral surface thereof.

6. A method according to claim 1, wherein the bracket has a shape so as to surround the axis-of-rotation in a lateral cross section with respect to the axis.

7. A method according to claim 6, wherein the bracket is generally a C-shape or a channel shape in the lateral cross section with respect to the axis.

8. A method according to claim 1, wherein a surface of the shoulder portion on the side where the pin of the rotating tool protrudes is formed more concaved as being closer to a proximal portion of the pin.

9. A method in accordance with claim 1, wherein the rotating tool forms part of a robot.

10. The friction stir welding apparatus according to claim 1, wherein the bracket has a transverse cross-section that surrounds the hollow surrounding shaft.

11. A friction stir welding apparatus in which by moving a rotating tool rotating at a high-speed along an axis-of-rotation thereof and pressing the rotating tool against a plurality of over-wrapped work pieces, the rotating tool softens and stirs a contact portion of the work pieces with a tip portion by a frictional heat caused by rotation thereof, and thus welds the work pieces together, the apparatus comprising:
- a rotational shaft, to which the rotating tool is fixed at a tip end, and extended along the axis-of-rotation;
- a rotational movement drive source for rotating the rotational shaft;
- a hollow surrounding shaft surrounding the rotational shaft;
- a rotating tool holding means for rotatably holding at least one of the rotating tool or the rotational shaft and being supported movably along the axis-of-rotation; and
- a linear movement drive source for linearly moving the rotating tool holding means along the axis-of-rotation to cause the rotating tool linearly move along the axis-of-rotation,
- wherein the rotating tool includes a pin which forms said tip portion thereof and a shoulder portion coupled with the pin so as to protrude the pin toward from one end surface thereof and having a larger diameter than the pin,
- wherein the apparatus is so configured that the linear movement drive source rotates the hollow surrounding shaft, the rotating tool holding means having a hole into which the surrounding shaft is inserted, and the hole is formed with an inner threaded portion which threadedly engages with an outer threaded portion similarly formed on the outer peripheral surface of the hollow surrounding shaft, thereby transmitting a rotation of the hollow surrounding shaft caused by the linear movement drive source into a linear movement of the rotating tool holding means along the axis-of-rotation; and
- wherein the rotating tool holding means includes a bracket made of a rigid material, and
- wherein the bracket extends along the axis of rotation, threadedly engages with the outer threaded portion of the hollow surrounding shaft at one end portion, and the other end portion of the bracket rotatably holds the at least one of the rotating tool or the rotating shaft.

12. The friction stir welding apparatus according to claim 11, wherein the rotating tool holding means is provided with a header for detachably holding the rotating tool.

13. The friction stir welding apparatus according to claim 11, wherein the rotating tool holding means comprises a bracket and is made of a rigid material.

14. The friction stir welding apparatus according to claim 11, wherein the rotating tool holding means is supported by a linear guide linearly movable along the axis-of-rotation.

15. The friction stir welding apparatus according to claim 11, wherein the rotating tool holding means comprises a bracket that threadedly engages the outer threaded portion of the hollow surrounding shaft through a cylindrical nut member with the inner threaded portion formed in the inner peripheral surface thereof.

16. The friction stir welding apparatus according to claim 11, wherein the rotating tool holding means comprises a bracket and has a shape so as to surround the axis-of-rotation in the lateral cross section with respect to the axis.

17. The friction stir welding apparatus according to claim 16, wherein the bracket is generally a C-shape or a channel shape in the lateral cross section with respect to the axis.

18. The friction stir welding apparatus according to claim 11, wherein a surface of the shoulder portion on the side where the pin of the rotating tool protrudes is formed more concaved as being closer to a proximal portion of the pin.

19. A robot comprising friction stir welding apparatus according to claim 11.

20. The friction stir welding apparatus according to claim 11, wherein the bracket has a transverse cross-section in which it surrounds the hollow surrounding shaft.

21. A friction stir welding apparatus, the apparatus comprising:
- a rotational shaft extending along an axis of rotation and arranged to operatively support a rotating tool;
- a first rotational drive source operatively coupled to the rotational shaft;
- a rotatable outer shaft surrounding the rotational shaft and fixed against axial movement, the outer shaft having a threaded outer surface;
- a second rotational drive source operatively coupled to the outer shaft; and
- a tool support bracket having a header, the header arranged to operatively support the rotational shaft, the tool support bracket having a nut engaging the threaded outer surface of the outer shaft, the tool support bracket guided for linear translation along a linear guide and arranged for linear translation in response to rotation of the outer shaft to permit linear movement of the tool support bracket and hence the rotational shaft.

* * * * *